United States Patent [19]

Lynch et al.

[11] Patent Number: 5,094,989
[45] Date of Patent: Mar. 10, 1992

[54] PROCESS FOR ACTIVATION OF CATALYSTS

[75] Inventors: Charles S. Lynch, Moreland Hills; Linda C. Glaeser, Lyndhurst; James F. Brazdil, Jr., Mayfield Village; Mark A. Toft, Lakewood, all of Ohio

[73] Assignee: The Standard Oil Company, Cleveland, Ohio

[21] Appl. No.: 631,837

[22] Filed: Dec. 21, 1990

[51] Int. Cl.$^5$ .................. B01J 23/18; B01J 23/22
[52] U.S. Cl. .................. 502/202; 502/215; 502/304; 502/309; 502/312; 502/324; 502/325; 502/337; 502/338; 502/340; 502/343; 502/344; 502/345; 502/349; 502/350; 502/353; 502/354
[58] Field of Search ............... 502/202, 215, 304, 309, 502/312, 324, 325, 337, 338, 340, 343, 344, 345, 349, 350, 353, 354

[56] References Cited

U.S. PATENT DOCUMENTS 4,746,641  5/1988  Guttmann et al. ............ 502/353 X
4,837,233  6/1989  Glaeser et al. ............... 502/312 X

FOREIGN PATENT DOCUMENTS 1176233  1/1970  United Kingdom ............ 502/353

Primary Examiner—W. J. Shine
Attorney, Agent, or Firm—C. S. Lynch; M. F. Esposito; L. W. Evans

[57] ABSTRACT

Disclosed is a process for making an activated antimony and vanadium-containing catalyst in oxide form having an atomic ratio of Sb:V in the range from 0.8-4, which comprises calcining such an oxidic vanadium and antimony-containing composition at a temperature of over 750° C., and thereafter contacting said calcined catalyst with a hydroxy compound in liquid form selected from (1) cyclohexanol, (2) cyclopentanol, (3) a monohydroxy, acyclic hydrocarbon having 1-8 C atoms, and (4) a dihydroxy, acyclic hydrocarbon having 2-4 carbon atoms, and separating as a liquid said compound from said catalyst insofar as it is present beyond the amount wetting said catalyst, and thereafter drying said catalyst.

6 Claims, No Drawings

PROCESS FOR ACTIVATION OF CATALYSTS

This invention relates to the activation of vanadium-antimony oxide catalysts.

The catalysts activated by the method of the invention have improved catalytic activity in the vapor phase ammoxidation of propane with ammonia and molecular oxygen.

It is an object of the invention to activate catalytic compositions comprising vanadium and antimony in oxidic form.

Another object of the invention is to improve the catalytic activity of such catalyst compositions for the ammoxidation of propane to acrylonitrile or to acrylonitrile plus propylene.

Other objects, as well as aspects, features and advantages, of the present invention will become apparent from a study of the accompanying disclosure, including the specific examples, and the claims.

A further object is to provide a catalyst composition activated according to the present process.

These and other objects are realized by the present invention according to which there is provided a process for making an activated antimony and vanadium-containing catalyst in oxide form having an atomic ratio of Sb:V in the range from 0.8–4, which comprises calcining such an oxidic vanadium and antimony-containing composition at a temperature of over 750° C., usually at least 780° C., and thereafter contacting said calcined catalyst with a hydroxy compound in liquid form (usually having no carbon-to-carbon unsaturation) selected from (1) cyclohexanol, (2) cyclopentanol, (3) a monohydroxy, acyclic hydrocarbon having 1–8 C atoms, usually 1–10 C atoms, and (4) a dihydroxy, acyclic hydrocarbon having 2–4 carbon atoms, and separating as a liquid said compound from said catalyst insofar as it is present beyond the amount wetting said catalyst, and thereafter drying said catalyst.

Especially useful hydroxy compounds are the monohydroxy, acyclic hydrocarbons having 1–8 C atoms, and the dihydroxy, acyclic hydrocarbons having 2–4 C atoms. Most useful are the monohydroxy, acyclic hydrocarbons having 1–4 C atoms, especially isobutanol.

The upper calcination temperature can be up to 1200° C. in a given instance, and usual activation temperatures are at least 780° C., more often at least 790° C., while the activation temperature is most often not over 1050° C.

The calcining step activates the catalyst to a significant degree, and the contacting with the alcohol (hydroxy compound) further activates the catalyst to produce a catalyst of the invention.

The process of the invention is especially effective in producing an active catalyst when the foregoing composition containing V and Sb in an atomic ratio of Sb to V of 0.8 to 4 also contains 0.01 to 2 atoms of one or more of Ti, Sn, Fe, Cr and Ga per atom of V, with or without up to 2 atoms per atom of V of one or more of Li, Mg, Ca, Sr, Ba, Co, Ni, Zn, Ge, Nb, Zr, Mo, W, Cu, Te, Ta, Se, Bi, Ce, In, As, B and Mn. It is particularly useful to use from this group Cu, Mg, Mn, Bi, Mo, and Li.

The catalysts made according to the present invention are also useful for ammoxidation of $C_4$ to $C_5$ acyclic paraffins in addition to propane, with ammonia and molecular oxygen.

All of the specific examples of catalysts that follow were made by the method of claim 4 of U.S. Pat. No. 4,784,979, issued Nov. 15, 1988, and were activated to an active catalyst by heating at 810° C. for 1–3 hours unless another calcination temperature is specifically noted. The catalysts of the examples not marked "Comparative" were contacted with a hydroxy compound as defined in the present claims.

The examples are illustrations only and are not to be considered as limiting.

EXAMPLE 1

Catalyst: $VSb_{1.4}Sn_{0.2}Ti_{0.2}Bi_{0.001}O_x$ 26.87 g of $V_2O_5$ powder was added to a mixture of 140 g of a 30% $H_2O_2$ solution in water and 900 ml of water in a 2 liter beaker. After about 20 minutes, 59.99 g of $Sb_2O_3$ powder was added. The beaker was covered with a watch glass and the mixture was stirred and heated for about 3 hours. During this time the slurry gradually turned blackish-grey. 44.31 g of 20% $SnO_2$ sol, 4.70 g $TiO_2$ powder, and 0.14 g $Bi(NO_3)_3.5H_2O$ were added to the foregoing dispersion. The mixture was stirred in an uncovered beaker for about 4 hours with heating in order to reduce the volume by evaporation of water. When the mixture could no longer be stirred it was dried in an oven for about 16 hours at 120° C. Thereafter it was calcined for 8 hours at 650° C., cooled and then crushed and sieved to 20–35 mesh. A portion of this catalyst was activated by calcining for 3 hours at 810° C.

A portion of the heat-activated catalyst was contacted with isobutanol using 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through funnel without suction. After all the isobutanol had passed through the funnel, the catalyst was dried in an oven at 120° C.

EXAMPLE 2

Comparative

Catalyst: $VSb_{1.65}O_x$

This control catalyst was made by the procedure of Example 1 except that only $V_2O_5$ and $Sb_2O_3$ were used, and the isobutanol contact and drying steps were not used.

EXAMPLE 3

A portion of the heat-activated catalyst of Example 2 was contacted with isobutanol and dried as in Example 1. Two liters of isobutanol per gram of catalyst were passed over the catalyst.

EXAMPLE 4

Catalyst: $VSb_{1.5}Sn_{0.2}O_x$

This catalyst was made in the manner of Example 1, except that about 286 ml of methanol per g of catalyst was used instead of the isobutanol of Example 1.

EXAMPLE 5

Comparative

Catalyst: $V_{0.95}Sb_{1.7}Fe_{0.05}O_x$

This control catalyst was made in the manner of the first paragraph of example 1. Fe was introduced as $Fe(NO_3)_3.9H_2O$.

EXAMPLE 6

The composition of Example 5 was treated as in Example 5 and was then contacted with isobutanol in a Soxhlet extractor for 16 hours at atmospheric pressure, then dried in an oven at 120° C.

EXAMPLE 7

Catalyst: $VSb_{1.5}Sn_{0.2}O_x$

A catalyst having the composition of Example 4 was made in the manner of the first paragraph of Example 1. It was then contacted with isobutanol and dried as in Example 1, except that 143 g of isobutanol per g. of catalyst was used.

EXAMPLE 8

Comparative

Catalyst: $VSb_{1.5}Sn_{0.2}O_x$

Another catalyst with the same composition as in Example 4 was made as in the first paragraph of Example 1. This is an untreated control catalyst.

EXAMPLES 9-12

Catalysts having the composition of Example 8 and made in the manner of the first paragraph of Example 1 were activated by contacting with various alcohols as noted below:

| Example | Alcohol | ml/g. catalyst |
|---|---|---|
| 9 | n-butanol | 62.5 |
| 10 | isopropanol | 62.5 |
| 11 | ethanol | 62.5 |
| 12 | ethylene glycol | 62.5 |

EXAMPLE 13

Catalyst: $VSb_{1.4}Sn_{0.2}Ti_{0.2}O_x$

This catalyst was prepared as in example 1 (except of course, no Bi was added).

EXAMPLE 14

Comparative

A control catalyst of the composition of Example 13 was made as in Example 13, except that no treatment was used after the calcination at 810° C. for 3 hours.

EXAMPLE 15

Catalyst: 93 wt. % $VSb_{1.5}Sn_{0.5}O_x$ + 7 wt. % $SiO_2$

This catalyst was made in the manner of Example 1. The silica support or diluent was introduced as 40 wt % $SiO_2$ sol, ammonia stabilized. Another difference from Example 1 is that 62.5 ml. isobutanol was used per gram of catalyst.

EXAMPLE 16

Comparative

Catalyst: $VSb_{1.7}Ti_{0.1}O_x$

This control catalyst was made in the manner described in the first paragraph of Example 1.

EXAMPLE 17

The catalyst of Example 17 was further treated with isobutanol and dried, as in Example 6.

EXAMPLE 18

Catalyst: $VSb_{1.7}Ti_{0.1}Li_{0.01}O_x$

The catalyst was made in the manner of Example 1, first paragraph and was then activated with isobutanol and dried, as in Example 6.

EXAMPLE 19

Catalyst: $VSb_{1.4}Sn_{0.2}Ti_{0.2}Bi_{0.001}Mo_{0.001}O_x$

The above catalyst was made as in Example 1. Mo was introduced as $(NH_4)_6Mo_7O_{24}.4H_2O$.

EXAMPLE 20

Catalyst: $VSb_{1.4}Sn_{0.2}Ti_{0.2}Mn_{0.001}O_x$

This catalyst was made in the manner of Example 1. Mn was introduced as a 50% solution of $Mn(NO_3)_2$ in water.

EXAMPLE 21

Catalyst: $VSb_{1.4}Sn_{0.2}Ti_{0.2}Cu_{0.001}O_x$

This catalyst was made in the manner of Example 1. Cu was introduced as $Cu(NO_3)_2.2.5H_2O$.

EXAMPLE 22

Catalyst: $VSb_{1.4}Sn_{0.2}Ti_{0.2}Fe_{0.001}O_x$

This catalyst was made in the manner of Example 1. Fe was introduced as $Fe(NO_3)_3.9H_2O$.

EXAMPLE 23

Catalyst: $VSb_{1.4}Sn_{0.2}Ti_{0.2}Mg_{0.001}O_x$

This catalyst was made in the manner of Example 1. Mg was introduced as $Mg(NO_3)_2.6H_2O$.

EXAMPLE 24

Catalyst: $VSb_{1.4}Sn_{0.2}Ti_{0.2}Cr_{0.001}O_x$

This catalyst was made in the manner of Example 1. Cr was introduced as $CrO_3$.

EXAMPLE 25

Catalyst: 80 wt % $VSb_{1.2}Sn_{0.1}Ti_{0.1}O_x$ + 20 wt % $SiO_2$

This catalyst was made in the manner of Example 1 except for the proportions. The silica support or diluent makes the catalyst less dense. It was introduced as 40 wt % $SiO_2$ sol, ammonia stabilized.

EXAMPLE 26

Comparative

Catalyst: $VSb_{1.7}Ga_{0.05}O_x$

This catalyst was made by the procedure of Example 2, except that $Ga(NO_3)_3$ was added to the slurry resulting from the reaction of the vanadium compound and the antimony compound before the drying and calcination. Of course, Sn, Ti and Bi additions were omitted. This is a control catalyst.

EXAMPLE 27

Catalyst: $VSb_{1.7}Ga_{0.05}O_x$

This catalyst was made by the procedure of Example 26, followed by contacting a portion of the catalyst with isobutanol using 62.5 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through funnel without suction. After all the isobutanol had passed through the funnel, the catalyst was dried in an oven at 120° C.

EXAMPLE 28

Comparative

Catalyst: $VSb_{1.4}Sn_{0.2}Ti_{0.2}O_x$

Another catalyst of the composition of Example 13 was made in the same manner as that catalyst except the isobutanol contacting and drying steps were omitted.

EXAMPLE 29

Catalyst: $VSb_{1.4}Sn_{0.2}Ti_{0.2}O_x$

This catalyst is a portion of Example 28 that was contacted with 6.25 ml of isobutanol and dried as described in the second paragraph of Example 1.

EXAMPLE 30

Comparative

Catalyst: 80% $VSbSn_{0.3}O_x$-20% $SiO_2$ support

This control catalyst was prepared by the general procedure of the first paragraph of Example 1. The $SiO_2$ was introduced as a 40 wt % sol, ammonia stabilized.

EXAMPLE 31

Catalyst: 80% $VSbSn_{0.3}O_x$-20% $SiO_2$ Support

This is a portion of the catalyst of Example 30 that was contacted with 2 liters of isobutanol per g of catalyst and dried, as in the second paragraph of Example 1.

EXAMPLE 32

Catalyst: $VSb_{1.4}Sn_{0.2}Ti_{0.2}O_x$

This catalyst was made by the procedure of the catalyst of Example 13 except that t-butanol was used instead of isobutanol.

EXAMPLE 33

Catalyst: $VSb_{1.4}Sn_{0.2}Ti_{0.2}O_x$

This catalyst was made by the procedure of the catalyst of Example 13 except that sec-butanol was used instead of isobutanol.

EXAMPLE 34

Catalyst: $VSb_{1.4}Sn_{0.2}Ti_{0.2}O_x$

This catalyst was made by the procedure of the catalyst of Example 13 except that cyclohexanol was used instead of isobutanol.

EXAMPLE 35

Catalyst: $VSb_{1.4}Sn_{0.2}Ti_{0.2}O_x$

This catalyst was made by the procedure of the catalyst of Example 13 except that 1-hexanol was used instead of isobutanol.

EXAMPLE 36

Catalyst: $VSb_{1.4}Sn_{0.2}Ti_{0.2}O_x$

This catalyst was made by the procedure of the catalyst of Example 13 except that 1-octanol was used instead of isobutanol.

EXAMPLE 37

Catalyst: $VSb_{1.4}Sn_{0.2}Ti_{0.2}O_x$

This catalyst was made by the procedure of the catalyst of Example 13 except that 1,4-butanediol was used instead of isobutanol.

EXAMPLE 38

Catalyst: $VSb_{1.4}Sn_{0.2}Ti_{0.2}Mg_{0.001}O_x$

This catalyst was made in the same manner as Example 1 (except that Bi was replaced by Mg).

EXAMPLE 38A

Catalyst: $VSb_{1.4}Sn_{0.2}Ti_{0.1}O_x$.

27.44 g of $V_2O_5$ powder was added to a mixture of 100 g of a 30% $H_2O_2$ solution in water and 900 ml of water in a 2 liter beaker. After about 20 minutes, 61.26 g of $Sb_2O_3$ powder was added. The beaker was covered with a watch glass and the mixture was stirred and heated for about 3 hours. During this time the slurry gradually turned blackish-grey. 45.24 g of 20% $SnO_2$ sol (Batch No. LT0095SLO, Nalco Chemical Co., Product No. 88SN-123), and 2.40 g $TiO_2$ powder were added to the foregoing dispersion. The mixture was stirred in an uncovered beaker for about 4 hours with heating in order to reduce the volume by evaporation of water. When the mixture could no longer be stirred it was dried in an oven for about 16 hours at 120° C. Thereafter it was calcined for 8 hours at 650° C., cooled and then crushed and sieved to 20-35 mesh. A portion of this catalyst was activated by calcining for 3 hours at 810° C.

A portion of the heat-activated catalyst was contacted with isobutanol using 6.25 ml of isobutanol per gram of catalyst by placing the catalyst in a coarse glass frit funnel, pouring the isobutanol over the catalyst, stirring the catalyst in the isobutanol in order to spread the catalyst evenly over the bottom of the funnel, then allowing the isobutanol to pass through funnel without suction. After all the isobutanol had passed through the funnel, the catalyst was dried in an oven at 120° C.

In the following ammoxidation examples summarized in Tables 1-3, the catalyst is in a tubular ⅜ inch I.D. titanium metal fixed bed reactor. The reactor is equipped with a preheat leg and is immersed in a temperature controlled molten salt bath. The feed is fed to the catalyst for one hour before collection of product, unless otherwise noted; the runs of each example last 30-60 minutes during which the product is collected for analysis.

As will be evident to those skilled in the art, various modifications of this invention can be made or followed in the light of the foregoing disclosure and discussion without departing from the spirit and scope of the disclosure or from the scope of the claims.

TABLE 1

| Example No. | Catalyst Example No. | Mole Ratios $C_3/NH_3/O_2/H_2O$ (6) | Temp. °C. | CT Secs (4) | Percent Propane Conversion | Propane: Mole % Conversion to (2) AN | HCN | (3) $C_3=$ | AN+ $C_3=$ | % Selectivity (1) AN | AN+ $C_3=$ |
|---|---|---|---|---|---|---|---|---|---|---|---|
| 39 | 1 | 5/1/2.8/1 | 460 | 1.3 | 15.2 | 9.4 | 1.5 | 0.3 | 9.6 | 61.5 | 63.3 |
| 40 (5) | 2 (5) | 5/0.85/2/1 | " | " | 13.6 | 1.4 | 1.7 | 4.9 | 6.3 | 10.0 | 46.1 |
| 41 | 3 | " | " | " | 12.6 | 4.7 | 1.6 | 2.3 | 7.0 | 37.6 | 55.6 |
| 42 | 4 | " | " | 1.4 | 13.5 | 7.6 | 1.1 | 0.5 | 8.1 | 56.4 | 60.3 |
| 43 (5) | 5 (5) | 5/1/2/1 | 470 | 1.8 | 13.8 | 7.1 | 1.4 | 1.4 | 8.5 | 51.6 | 61.3 |
| 44 | 6 | " | " | " | 13.7 | 8.1 | 1.3 | 0.8 | 8.9 | 58.8 | 64.8 |
| 45 | 7 (7) | 5/0.85/2/1 | 460 | 1.4 | 14.4 | 8.5 | 1.1 | 0.7 | 9.2 | 58.8 | 63.8 |
| 46 (5) | 8 (5) | " | " | 1.5 | 14.3 | 7.4 | 1.4 | 1.1 | 8.5 | 52.1 | 59.6 |
| 47 | 9 | " | " | 1.3 | 14.1 | 8.2 | 1.2 | 0.6 | 8.8 | 58.0 | 62.7 |
| 48 | 10 | " | " | " | 13.9 | 7.9 | 1.1 | 0.7 | 8.6 | 57.1 | 61.9 |
| 49 | 11 | " | " | " | 13.1 | 7.6 | 0.9 | 0.8 | 8.4 | 58.2 | 64.2 |
| 50 | 12 | " | " | " | 14.0 | 7.8 | 1.0 | 0.8 | 8.6 | 55.5 | 61.3 |
| 50 | 13 | 5/1/2.8/1 | " | 1.4 | 14.5 | 9.0 | 1.3 | 0.4 | 9.4 | 61.9 | 64.4 |
| 52 (5) | 14 (5) | 5/0.85/2/1 | " | " | 14.3 | 7.1 | 1.1 | 1.1 | 8.2 | 49.4 | 57.5 |
| 53 | 15 | " | " | 1.3 | 13.7 | 8.0 | 1.2 | 0.6 | 8.6 | 58.3 | 62.5 |

(1) Selectivity based on propane
(2) AN is Acrylonitrile
(3) $C_3=$ is Propylene
(4) Contact Time, Seconds
(5) Control Example
(6) $C_3$ is Propane
(7) Run 24 hours before taking sample for analysis

TABLE 2

| Example No. | Catalyst Example No. | Mole Ratios $C_3/NH_3/O_2/H_2O$ (6) | Temp. °C. | CT Secs (4) | Percent Propane Conversion | Propane: Mole % Conversion to (2) AN | HCN | (3) $C_3=$ | AN+ $C_3=$ | % Selectivity (1) AN | AN+ $C_3=$ |
|---|---|---|---|---|---|---|---|---|---|---|---|
| 54 (5) | 16 (5) | 5/1/2/1 | 470 | 2.2 | 14.2 | 7.9 | 1.4 | 1.1 | 8.9 | 55.3 | 62.7 |
| 56 | 17 | " | 460 | 2.3 | 14.9 | 9.1 | 1.2 | 0.8 | 9.8 | 60.7 | 65.8 |
| 57 | 18 | " | 470 | 1.5 | 13.9 | 8.2 | 1.3 | 0.6 | 8.8 | 59.0 | 63.5 |
| 58 | 19 | 5/1/2.8/1 | 460 | 1.3 | 14.9 | 9.4 | 1.2 | 0.4 | 9.8 | 63.3 | 66.1 |
| 59 | 20 | " | " | " | 13.8 | 8.6 | 1.4 | 0.3 | 8.9 | 62.2 | 64.6 |
| 60 | 21 | " | " | 1.4 | 13.1 | 8.4 | 1.4 | 0.2 | 8.7 | 64.3 | 66.0 |
| 61 | 22 | " | " | " | 15.3 | 9.3 | 1.6 | 0.3 | 9.6 | 60.3 | 62.4 |
| 62 | 23 | " | " | 1.8 | 14.0 | 9.2 | 1.4 | 0.1 | 9.3 | 65.7 | 66.3 |
| 63 | 24 | " | " | 2.0 | 14.4 | 9.1 | 1.5 | 0.1 | 9.2 | 62.8 | 63.5 |
| 64 | 25 | 5/0.85/2/1 | " | 1.8 | 14.3 | 7.9 | 1.4 | 0.7 | 8.6 | 55.2 | 60.3 |
| 65 (5) | 26 (5) | 5/1/2/1 | 470 | 1.2 | 14.4 | 7.0 | 1.6 | 1.6 | 8.6 | 48.3 | |
| 66 | 27 | " | 460 | " | 13.9 | 7.1 | 1.7 | 1.0 | 8.1 | 51.0 | |
| 67 (5) | 28 (5) | 5/0.85/2/1 | " | 1.4 | 15.3 | 7.7 | 1.8 | 1.4 | 9.1 | 50.1 | 59.3 |
| 68 | 29 | " | " | " | 15.6 | 9.7 | 1.6 | 0.3 | 10.0 | 62.0 | 64.1 |
| 69 (5) | 30 (5) | " | " | 1.7 | 14.8 | 3.7 | 1.7 | 3.8 | 7.5 | 24.9 | |
| 70 | 31 | " | " | 1.7 | 12.9 | 6.1 | 1.8 | 0.2 | 6.3 | 47.0 | |

See Table 1 for Footnotes

TABLE 3

| Example No. | Catalyst Example No. | Mole Ratios $C_3/NH_3/O_2/H_2O$ (6) | Temp. °C. | CT Secs (4) | Percent Propane Conversion | Propane: Mole % Conversion to (2) AN | HCN | (3) $C_3=$ | AN+ $C_3=$ | % Selectivity (1) AN | AN+ $C_3=$ |
|---|---|---|---|---|---|---|---|---|---|---|---|
| 67 (5) | 28 (5) | 5/0.85/2/1 | 460 | 1.4 | 15.3 | 7.7 | 1.8 | 1.4 | 9.1 | 50.1 | 59.3 |
| 71 | 32 | " | " | " | 15.2 | 8.4 | 1.5 | 1.0 | 9.4 | 55.6 | 62.0 |
| 72 (5) | 28 (5) | " | " | 1.3 | 13.6 | 7.2 | 1.5 | 0.9 | 8.1 | 52.9 | 59.9 |
| 73 | 33 | " | " | 1.4 | 14.4 | 8.2 | 1.4 | 0.9 | 9.1 | 56.8 | 63.1 |
| 74 | 34 | " | " | 2.1 | 13.4 | 7.2 | 1.5 | 0.8 | 8.0 | 54.0 | 60.3 |
| 75 | 35 | " | " | 1.4 | 13.5 | 8.0 | 1.4 | 0.7 | 8.7 | 58.9 | 64.3 |
| 76 | 36 | " | " | 2.4 | 12.6 | 7.4 | 1.4 | 0.6 | 8.0 | 58.6 | 63.1 |
| 77 | 36 | 5/1/2.8/1 | " | 2.4 | 14.1 | 8.5 | 1.6 | 0.4 | 8.9 | 60.5 | 63.5 |
| 78 | 37 | 5/0.85/2/1 | " | 2.4 | 11.5 | 7.0 | 1.3 | 0.4 | 7.4 | 60.8 | 64.1 |
| 79 | 38 | 5/1/2.8/1 | " | 1.8 | 14.0 | 9.2 | 1.4 | 0.1 | 9.3 | 65.7 | 66.3 |
| 80 | 38A | 5/1/2.8/1 | " | 1.4 | 15.1 | 9.1 | 1.6 | 0.5 | 9.6 | 60.4 | 63.5 |

See Table 1 for Footnotes

We claim:

1. A process for making an activated antimony and vanadium-containing catalyst in oxide form having an atomic ratio of Sb:V in the range from 0.8–4, which comprises calcining such an oxidic vanadium and antimony-containing composition at a temperature of over 750° C., and thereafter contacting said calcined catalyst with a hydroxy compound in liquid form selected from (1) cyclohexanol, (2) cyclopentanol, (3) a monohydroxy, acyclic hydrocarbon having 1–8 C atoms, and (4) a dihydroxy, acyclic hydrocarbon having 2–4 carbon atoms, and separating as a liquid said compound from said catalyst insofar as it is present beyond the amount wetting said catalyst, and thereafter drying said catalyst.

2. A process according to claim 1 wherein said calcination temperature is at least 780° C.

3. A process according to claim 1 wherein said catalyst contains 0.01 to 2 total atoms of one or more of Ti, Sn, Fe, Cr and Ga per atom of V, and optionally up to 2 atoms per atom of V of one or more of Li, Mg, Ca, Sr, Ba, Co, Ni, Zn, Ge, Nb, Zr, Mo, W, Cu, Te, Ta, Se, Bi, Ce, In, As, B and Mn.

4. A process according to claim 3 wherein said calcination temperature is at least 780° C.

5. A process according to claim 1 wherein said hydroxy compound is selected from (3) and (4) of claim 1.

6. A process according to claim 1 wherein said hydroxy compound is isobutanol.

* * * * *